(12) United States Patent
Verdun

(10) Patent No.: US 7,546,418 B2
(45) Date of Patent: Jun. 9, 2009

(54) SYSTEM AND METHOD FOR MANAGING POWER CONSUMPTION AND DATA INTEGRITY IN A COMPUTER SYSTEM

(75) Inventor: Gary J. Verdun, Belton, TX (US)

(73) Assignee: Dell Products L.P., Round Rock, TX (US)

( * ) Notice: Subject to any disclaimer, the term of this patent is extended or adjusted under 35 U.S.C. 154(b) by 611 days.

(21) Appl. No.: 10/644,427

(22) Filed: Aug. 20, 2003

(65) Prior Publication Data

US 2005/0044448 A1    Feb. 24, 2005

(51) Int. Cl.
*G06F 12/12* (2006.01)
(52) U.S. Cl. ...................................... 711/133
(58) Field of Classification Search ............... 711/133
See application file for complete search history.

(56) References Cited

U.S. PATENT DOCUMENTS

| 5,479,636 | A | 12/1995 | Vanka et al. ............. 395/460 |
| 5,561,783 | A | 10/1996 | Vanka et al. ............. 395/468 |
| 5,617,530 | A | 4/1997 | Stallmo et al. ......... 395/182.04 |
| 5,860,112 | A | 1/1999 | Langendorf et al. ......... 711/143 |
| 6,085,330 | A | 7/2000 | Hewitt et al. ............. 713/322 |
| 6,256,708 | B1 | 7/2001 | Watanabe .................... 711/122 |
| 7,017,054 | B2 * | 3/2006 | Schuckle et al. ............ 713/300 |
| 2004/0006716 | A1 | 1/2004 | Schuckle et al. ............ 713/300 |

* cited by examiner

*Primary Examiner*—Hyung S Sough
*Assistant Examiner*—Hamdy S Ahmed
(74) *Attorney, Agent, or Firm*—Baker Botts L.L.P.

(57) ABSTRACT

A system and method for managing power consumption and data integrity in a computer system is disclosed in which the a memory controller of the computer system records in a buffer the addresses of writes to system memory that occur during the period that the processor is in a low power state. When the processor exits the low power state, the processor invalidates in its internal cache those cache lines that correspond to the addresses recorded in the buffer.

22 Claims, 2 Drawing Sheets

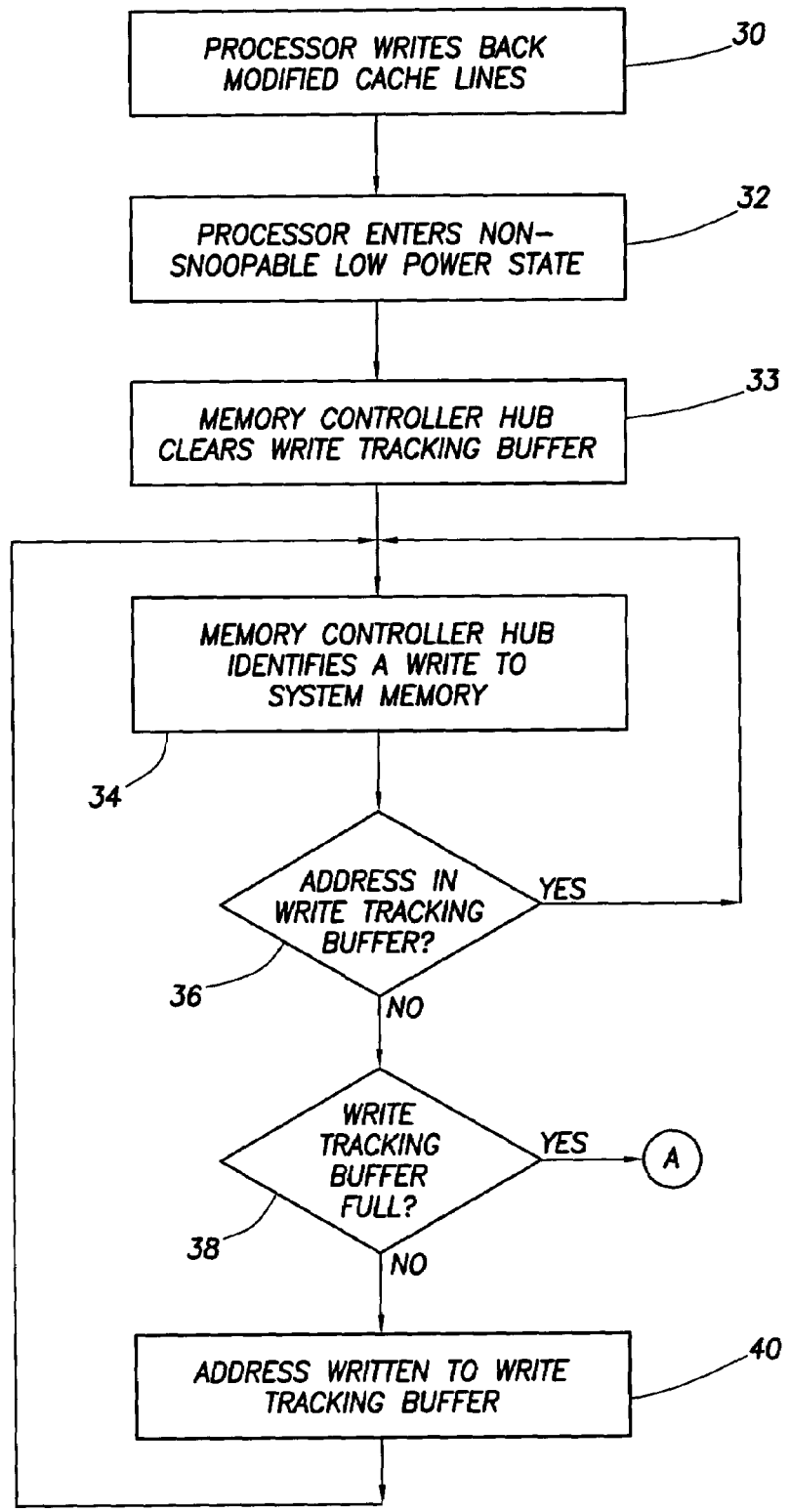

SYSTEM AND METHOD FOR MANAGING POWER CONSUMPTION AND DATA INTEGRITY IN A COMPUTER SYSTEM

TECHNICAL FIELD

The present disclosure relates generally to the field of computer systems, and, more particularly, to a system and method for managing power consumption in a computer system.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include a processor, sometimes referred to as a microprocessor, and an associated chip set. A chip set is a set of components that are designed to work with the processor and form a portion of the hardware architecture of the computer system or information handling system. Typically, the processor of a computer system will consume a large amount of power. In the case of a portable or laptop computer system, the power consumption by the processor will limit the effective use of the computer, as the power consumed by the processor will drain the local battery of the portable computer, limiting the ability to use the portable computer system without an external power source. One technique for limiting the amount of power consumed by a processor in a laptop computer system involves placing the processor in a reduced power state. A processor may have one or more reduced power states. While the computer system is in a particular reduced power state, the function of the processor of the computer system may be limited to reduce the power consumed by the computer system.

The processors of many computer systems include an internal cache. A cache memory subsystem improves the performance of a computer system. A cache memory is typically a smaller, higher performance memory system, as compared to the larger but slower system memory. Frequently accessed instructions and data can be stored in the cache, thereby allowing the processor to access this data from the cache while avoiding the more time-consuming task of accessing frequently used data from system memory.

Access to the local or CPU cache by the processor includes both writes and reads. In a write-back cache, a write to the local cache does not automatically result in a corresponding write to the memory location in system memory. Instead, when a cache line is removed from the cache, the content of that cache line is written to system memory if that cache line has been modified. It is also recognized that an access to system memory may be initiated by bus masters other than the processor of the computer system. A USB host controller, for example, may access system memory as a bus master. As part of an access to system memory by a bus master other than the processor, a snoop operation is performed by the processor to determine if the bus master is attempting to access an address line in system memory that exists in modified form in the internal processor cache. If this snoop cycle were not included as part the memory access by the bus master, the bus master would run the risk of accessing from system memory data that had been previously modified in the local or CPU cache.

In some reduced power states, however, the local or CPU cache is not in a snoopable state. As such, a snoop operation cannot be performed to determine if the bus master is attempting to access a memory address that exists in modified form in the cache. Under these conditions, at least two undesirable approaches exist for the computer system. First, the computer system and the processor could be transferred out of its reduced power state into a snoopable, higher power state that would permit a snoop operation. This approach is undesirable, however, in that it results in excessive power consumption and frequent and time-consuming switching between power states. As a second approach, the bus master could simply access the data in the system memory without the benefit of the snoop operation. Following this approach, however, the bus master may access a dirty memory address, i.e., a memory location that is associated with modified data in the processor's internal cache.

SUMMARY

In accordance with the present disclosure, a system and method for managing power conservation and data integrity in a computer system or other information handling system is disclosed. The system disclosed herein includes a processor having an internal cache, a buffer, and a memory controller. When the processor enters a low power state, the memory controller records in the buffer the addresses of memory locations in system memory. When the processor exits the low power state, the processor invalidates in its internal cache those cache lines that correspond to the addresses recorded in the buffer. The process insures coherency between the processor's internal cache and the system memory of the computer system.

One technical advantage of the present disclosure is the processor is able to enter into a non-snoopable, low power state without compromising the data integrity of the computer system. Because the processor, upon exiting its low power state, invalidates in the cache those lines corresponding to modified data in system memory, the processor is able to return to a state in which the cache does not include any cache lines that are not current or updated as compared to the data in system memory.

Another technical advantage of the present disclosure is a computer system that provides for the ability of the processor to enter into a low power state, thereby preserving local battery power in the computer system, while also maintaining the cache coherency of the computer system. Even though the processor is able to enter a non-snoopable, low power state, the computer system is still able to support accesses by other bus masters to system memory. Modifications to data in system memory may be made without the necessity of causing the processor to enter a high power state for the purpose of snooping on the system memory access by the bus master. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 is a flow diagram for a method for recording address entries to a buffer during the period that the processor of the computer system is in a low power state.

DETAILED DESCRIPTION

The present disclosure concerns a system and method for managing power consumption and data coherency in a computer system. The present disclosure describes a system and method for managing the power states of the computer system such that the processor of the computer system can be placed in a non-snoopable power state without compromising the integrity of the data stored in the system memory of the computer system. The system and method provided herein permits a computer system to enter a low power state while maintaining the operational benefits of an internal processor cache.

Figure 1:
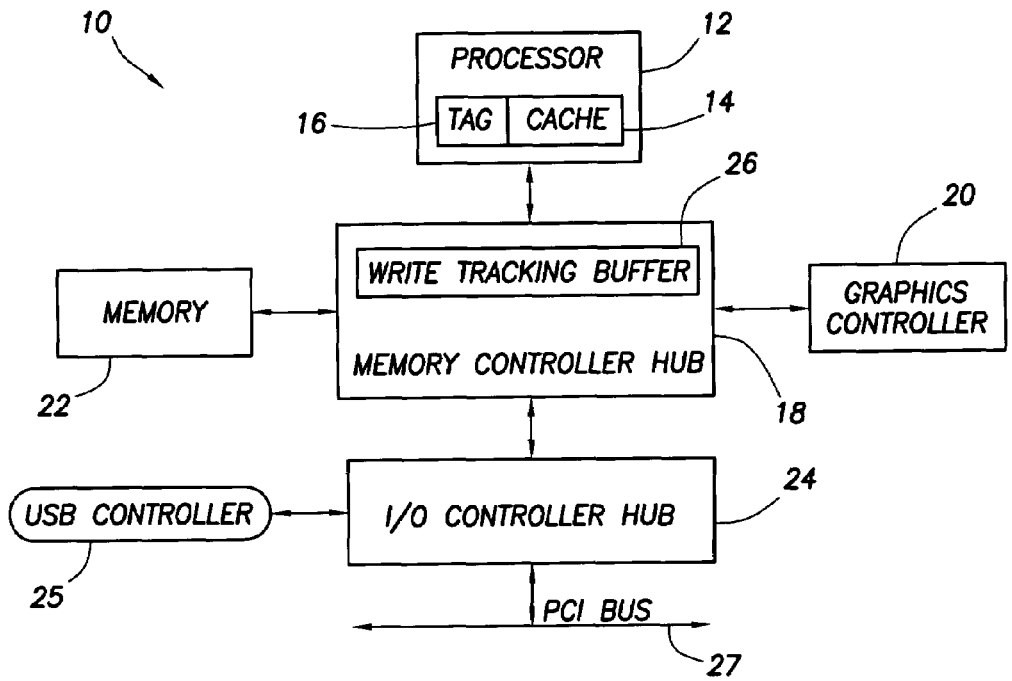
FIG. 1 is a block diagram of the architecture of a computer system.

The architecture of a computer system, which is indicated generally at 10, is shown in FIG. 1. Computer system 10 includes a processor 12, which includes an internal cache 14 and a corresponding tag RAM 16. Tag RAM 16 is a static memory location in processor 12 that holds the addresses of the memory blocks in system memory that correspond to the lines of data stored in the cache. Tag RAM 16 also includes a bit associated with each cache line to indicate whether the cache line associated with that tag RAM entry has been modified relative to the data stored in system memory. The bit is set when the corresponding cache line is modified, indicating that the contents of the cache line have been modified or updated relative to the data stored at the memory address in system memory. When the bit is set for a cache line, it is said that the corresponding memory location in system memory holds dirty data, i.e., data that is no longer current relative to the modified data in the processor's internal cache. The tag RAM bit for a cache line is reset when the cache line is written back to system memory, indicating that the contents of the cache line are the same as the contents of system memory.

Processor 12 is coupled to a memory controller hub (MCH) 18, which is coupled to a graphics controller 20 and system memory 22. Memory controller hub 18 is additionally coupled to an I/O controller hub (ICH) 24, which is coupled to a USB controller 25 and a PCI bus. 27. Like other I/O devices or gateways that may be coupled to ICH 24, USB controller 25 may act as a bus master that is independent of processor 12, allowing USB controller 25 to access system memory 22 without the involvement of the processor. Memory controller hub 18 includes a write tracking buffer 26.

When processor 12 enters a non-snoopable sleep state, write tracking buffer 26 stores a record of the addresses of the blocks of system memory that have been modified since the processor entered the non-snoopable sleep state. A flow diagram of a method for managing the power conservation and data integrity of the computer system having a write tracking buffer in a memory controller hub is shown in FIG. 2. At step 30 of FIG. 2, before processor 12 enters a non-snoopable low power state, processor 12 writes to system memory all modified lines in cache 14. This process is sometimes referred to as a write back operation, with the result being that the processor cache is clean. No modified cache lines exist in cache 14 relative to the content of the corresponding memory location in system memory. At step 32, processor 12 enters a non-snoopable, low power state, and, at step 33, memory controller hub 18 clears or invalidates the content of write tracking buffer 26.

During the period that processor 12 is in the non-snoopable, low power state, memory controller hub 18 records in write tracking buffer 26 the address of each modified memory block. System memory 22 may be accessed by bus masters of computer system 10, including, as just one example, USB host controller 25. With reference to FIG. 2, when memory controller hub 18 at step 34 identifies a write to system memory, memory controller hub at step 36 determines whether the address has previously been written to write tracking buffer 26. If the address has previously been written to write tracking buffer 26, the flow diagram proceeds to step 34. At step 34, MCH 18 identifies the next write to system memory during the period that processor 12 is in a non-snoopable, low power state. If the address of the modified block has not previously been written to write tracking buffer 36, memory controller hub 18 determines at step 38 if write tracking buffer 26 is full. If write tracking buffer 26 is not full, the address of the modified memory block is written to write tracking buffer 26, and the flow diagram proceeds to step 34, where memory controller hub 18 identifies the next write to system memory.

Figure 3:
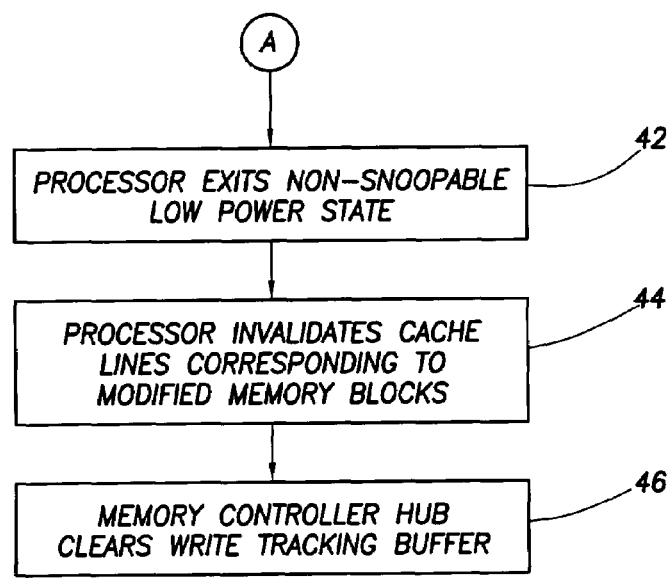
FIG. 3 is a flow diagram of a series of method steps relating to the invalidation by the processor of certain cache lines following the exit of the processor from a low power state.

If memory controller hub 18 determines at step 38 that write tracking buffer 26 is full, processor 12 exits the non-snoopable low power state (step 42 shown on FIG. 3). At step 44, processor 12 invalidates those cache lines corresponding to modified memory addresses that have been recorded in write tracking buffer 26. Following this invalidation step, cache 14 does not include any cache lines that are different in content than the corresponding blocks of system memory. As an alternative to or in addition to invalidating the cache lines that correspond to the modified addresses recorded in write tracking buffer 26, processor 12 can re-read into those cache lines the modified data from the corresponding memory locations in system memory. At step 46, memory controller hub 18 clears or invalidates the entries in write tracking buffer 26, readying write tracking buffer 26 for the next entry by processor 12 into a non-snoopable, low power state. Following step 46, processor 12 can operate in any snoopable state, or, following the process flow diagram of FIG. 2 beginning at step 32, processor 12 can immediately reenter a non-snoopable, low power state.

As described with respect to FIG. 2, method steps 44 and 46 of FIG. 3 are performed each time that it is determined at step 38 that write tracking buffer 38 is full. In addition, the method steps 44 and 46 of FIG. 3 are performed each time that it is necessary for the processor to exit, for any reason, a non-snoopable low power state. Once it is determined the processor 12 must, for any reason, exit a non-snoopable, low power state, the processor 12 at step 44 invalidates the cache lines corresponding to the modified memory blocks of system memory, as indicated by the memory addresses stored in write tracking buffer 26. Memory controller hub 18 at step 46 then clears write tracking buffer 26.

With reference to FIG. 2, following a determination at step 38 that write tracking buffer 26 is full, processor 12 exits its low power state because the memory controller hub is no longer able to track modified memory blocks in system memory. As such, processor 12 must enter a higher power state to invalidate those cache lines that correspond to memory block addresses in write tracking buffer 26. If processor 12 did not exit its low power state when it is determined that write tracking buffer 26 is full, entries in write tracking buffer 26 could possibly be overwritten, causing a loss of data integrity and cache coherency when processor 12 exits is low power state. At step 36, it was determined whether the modified memory address was already recorded in write tracking buffer 26. If so, processing continues at step 34 with the identification of the next write to system memory. If a modified memory address already appears in write tracking buffer 26, writing that memory address in write tracking buffer 26 a second time is unnecessary, considering that multiple writes to a single memory block in system memory do not impair the data integrity of the computer system under the methodology disclosed herein.

The system and method disclosed herein permits the processor to enter a non-snoopable, low power state, while maintaining the data integrity of the system during the time that system memory may be accessed by a bus master other than the processor. Writes to system memory are recorded, allowing the processor to invalidate selected lines of its cache following its exit from the low power state, with the result being that the content of the cache is coherent with the content of system memory shortly after its exit from the low power state. In a computer system or other information handling system following the system and methodology disclosed herein, both at the time when the enters its low power state and at the time when the processor exits its low power state, the content of the cache is coherent with the content of system memory.

It should be understood that the system and method disclosed herein is not limited to the precise architecture disclosed in FIG. 1. Rather, the system and method of the present disclosure could be employed with any suitable computer system architecture that involves the use of an internal processor cache and the ability to access system memory without the involvement of the processor. Although the present disclosure has been described in detail, it should be understood that various changes, substitutions, and alterations can be made hereto without departing from the spirit and the scope of the invention as defined by the appended claims.

What is claimed is:

1. A computer system, comprising:
    a processor;
    a cache associated with the processor;
    a system memory;
    a memory controller hub that is operable to track writes to the system memory by one or more bus masters operable to access the system memory;
    a write tracking buffer external to the processor, wherein the write tracking buffer is communicatively coupled to the cache via the processor and to the system memory, and wherein the write tracking buffer is operable to hold as entries the addresses of one or more writes to the system memory made during a period that the processor is in a low power state;
    wherein the memory controller hub is operable to:
        initialize the write tracking buffer when the processor enters a low power state;
        identify one or more writes to the system memory made during the period that the processor is in the low power state;
        determine if the write tracking buffer is full during the period that the processor is in the low power state; and
        if the write tracking buffer is not full, record the addresses of the one or more writes; and
    wherein the processor is operable to write to the system memory one or more lines of cache prior to the processor entering its low power state, and wherein the processor is operable to invalidate one or more lines of cache corresponding to the entries of the write tracking buffer upon the processor exiting its low power state.

2. The computer system of claim 1, wherein the low power state of the processor comprises a non-snoopable state in which the processor is not able to monitor accesses to the system memory.

3. The computer system of claim 1, wherein the cache is an internal processor cache.

4. A method for managing the power consumption by a processor in a computer system, the computer system including a system memory and the processor including an internal cache, comprising the steps of:
    maintaining a buffer in a memory controller hub that is operable to track one ore more writes to the system memory by one or more bus masters operable to access the system memory, wherein the buffer is:
        external to the processor; and
        communicatively coupled to the internal cache via the processor and to the system memory;
    causing the processor to enter a low power state;
    initializing the buffer when the processor enter the low power state;
    during a period that the processor is in a low power state:
        identifying one or more writes to the system memory made during the period;
        determining if the buffer is full;
        if the buffer is not full, recording one or more addresses of modified data in the system memory; and
    upon the processor exiting the low power state, invalidating one or more lines in the internal cache that correspond to the addresses recorded in the buffer.

5. The method for managing the power consumption by a processor in a computer system of claim 4, further comprising the step of invalidating the content of the buffer.

6. The method for managing the power consumption by a processor in a computer system of claim 4, wherein the step of causing the processor to enter a low power state comprises causing the processor to enter a low power state in which the processor is unable to perform a task of snooping accesses by the one or more bus masters to the system memory.

7. The method for managing the power consumption by a processor in a computer system of claim 4, wherein the step of writing to the buffer the addresses of modified data in the system memory comprises writing to the buffer the address of each block of memory modified by the one or more bus masters of the computer system during the period that the processor is in the low power state.

8. The method for managing the power consumption by a processor in a computer system of claim 7, wherein the step of writing to the buffer the addresses of modified data in the system memory comprises writing the address to the buffer only if it is determined that the address has not already been written to the buffer.

9. The method for managing the power consumption by a processor in a computer system of claim 8, further comprising the step of causing the processor to exit its low power state once the buffer is full.

10. The method for managing the power consumption by a processor in a computer system of claim 4, further comprising the step of, before causing the processor to enter the low power state, writing to the system memory the content of those lines of the internal cache that have been modified relative to the content at the corresponding addresses in the system memory.

11. A method for managing cache coherency in an information handling system, the information handling system including a processor with an internal cache and a system memory, comprising the steps of:
   maintaining a buffer in a memory controller hub that is operable to track one or more writes to the system memory by one or more bus masters operable to access the system memory, wherein the buffer is:
      external to the processor; and
      communicatively coupled to the internal cache via the processor and to the system memory;
   performing a write back operation to write to the system memory one or more cache lines that have been modified relative to content at corresponding memory addresses in the system memory;
   causing the processor to enter a low power state;
   initializing the buffer when the processor enter the low power state;
   during a period that the processor is in the low power state:
      identifying one or more writes to system memory made during the period;
      determining if the buffer is full;
      if the buffer is not full, recording memory addresses of data in the system memory that have been modified by a bus master in the information handling system; and
   upon the processor exiting the low power state for a higher power state, invalidating in the internal cache one or more cache lines corresponding to the memory addresses recorded in the buffer.

12. The method for managing cache coherency in an information handling system of claim 11, further comprising the step of clearing the buffer following the step of invalidating the cache lines corresponding to the memory addresses recorded in the buffer.

13. The method for managing cache coherency in an information handling system of claim 11, further comprising the step of, following the step of invalidating cache lines corresponding to memory addresses recorded in the buffer, writing to the invalidated cache lines content of corresponding memory addresses in the system memory.

14. The method for managing cache coherency in an information handling system of claim 11, wherein the step of writing to the buffer comprises writing to the buffer only if it is determined that the address of the modified memory location has not been previously recorded in the buffer.

15. The method for managing cache coherency in an information handling system of claim 11, further comprising the step of causing the processor to exit its low power state for a higher power state upon a determination that the buffer is full.

16. An information handling system, comprising:
   a processor having an internal processor cache;
   system memory;
   a buffer;
   a memory controller;
   wherein the memory controller is operable to populate the buffer with one or more addresses of writes made to the system memory during a period that the processor is in a low power state;
   wherein the buffer is:
      maintained in the memory controller;
      external to the processor; and
      communicatively coupled to the internal processor cache via the processor and to the system memory;
   wherein the memory controller is operable to:
      initialize the buffer when the processor enters the low power state;
      identify one or more writes to the system memory made during the period that the processor is in the low power state;
      determine if the buffer is full during the period that the processor is in the low power state; and
      if the buffer is not full, record the addresses of the one or more writes; and
   wherein the processor, upon entering the low power state, is operable to write to the system memory one or more lines of cache and, upon exiting the low power state, is operable to invalidate cache lines of the internal processor cache corresponding to the addresses recorded in the buffer.

17. The information handling system of claim 16, wherein the low power state is a non-snoopable state characterized by the inability of the processor to monitor writes to system memory by a bus master of the information handling system.

18. The information handling system of claim 16, wherein the memory controller is operable to cause the processor to exit its low power state when the buffer is full.

19. The information handling system of claim 16, wherein the processor is operable to perform, before entering a low power state, a write-back operation to the system memory in which all modified cache lines are written to the corresponding locations in the system memory.

20. A method for managing cache coherency in a computer system following the entry of a processor into a low power state, the computer system including a processor having an internal cache, a system memory, and a write tracking buffer that is external to the processor, is communicatively coupled to the internal cache via the processor and to the system memory, and is operable to store the addresses of system memory addresses modified during a period that the processor was in the low power state, wherein the write tracking buffer is maintained in a memory controller hub that is operable to track one or more writes to the system memory by one or more bus masters operable to access the system memory, comprising the steps of:
   causing the processor to enter the low power state;
   initialize the write tracking buffer when the processor enter the low power state;
   during the period that the processor is in a low power state:
      identifying one or more writes to the system memory made during the period;
      determining if the write tracking buffer is full;
      if the write tracking buffer is not full, recording one or more memory addresses of modified data in the system memory;
   causing the processor to exit the low power state; and
   invalidating in the internal cache those cache lines corresponding to the one or more memory addresses stored in the write tracking buffer.

21. The method for managing cache coherency in a computer system of claim 20, further comprising the step of clearing the write tracking buffer following the step of invalidating cache lines in the internal cache.

22. The method for managing cache coherency in a computer system of claim 21, further comprising the step of, following the step of invalidating cache lines corresponding to memory addresses stored in the buffer, writing to the invalidated cache lines content of the corresponding memory addresses in the system memory.

* * * * *